United States Patent [19]

Giordani

[11] 4,451,082

[45] May 29, 1984

[54] SEAT FOR A BABY'S PUSH CHAIR

[76] Inventor: Pietro Giordani, Via Cavallina, 4, 40100 Bologna, Italy

[21] Appl. No.: 284,493

[22] Filed: Jul. 17, 1981

[30] Foreign Application Priority Data

Aug. 1, 1980 [IT] Italy .............................. 53452/80[U]

[51] Int. Cl.³ .............................................. A47C 1/02
[52] U.S. Cl. ...................................... 297/90; 297/68; 297/84; 297/417; 297/464
[58] Field of Search ..................... 297/84, 90, 68, 464, 297/417

[56] References Cited

U.S. PATENT DOCUMENTS

| | | | |
|---|---|---|---|
| 608,359 | 8/1898 | Brower et al. | 297/90 |
| 3,269,768 | 8/1966 | Kinney | 297/464 |
| 3,424,493 | 1/1969 | Gottfried et al. | 297/464 |
| 3,934,929 | 1/1976 | Rabinowitz | 297/90 X |
| 3,950,026 | 4/1976 | Van Seenus | 297/464 X |
| 4,040,665 | 8/1977 | Wallace et al. | 297/417 |
| 4,234,228 | 11/1980 | Flamm | 297/464 |

FOREIGN PATENT DOCUMENTS 1301595 12/1972 United Kingdom ................ 297/464

Primary Examiner—James T. McCall
Attorney, Agent, or Firm—Merriam, Marshall & Bicknell

[57] ABSTRACT

A seat for a baby's push chair, which can be removed from a wheeled support structure of the push chair and used separately if desired. The seat comprises a support surface with two upstanding side panels, an adjustable rake backrest and an adjustable foot rest. The back rest and foot rest are interlinked by a parallelogram linkage which automatically changes the foot rest inclination when the back rest is adjusted. This linkage abuts the foot rest but is not pivotally attached to it thus permitting the foot rest to be folded right up to a collapsed configuration, and also allows a wide range of adjustment of inclination of the foot rest to be effected.

8 Claims, 10 Drawing Figures

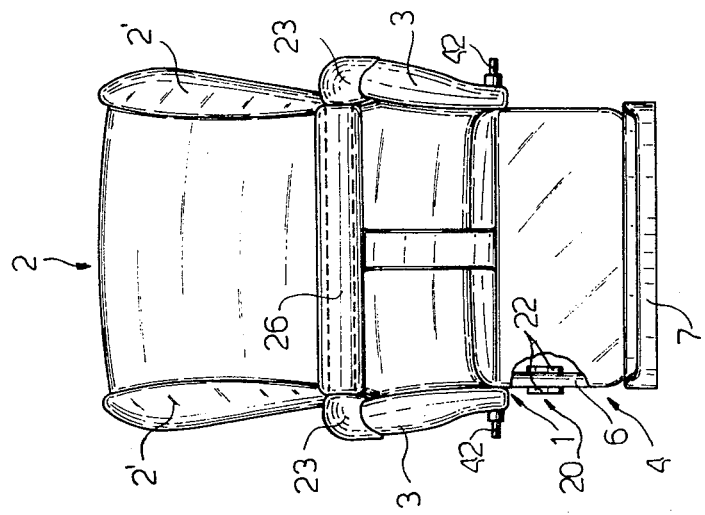
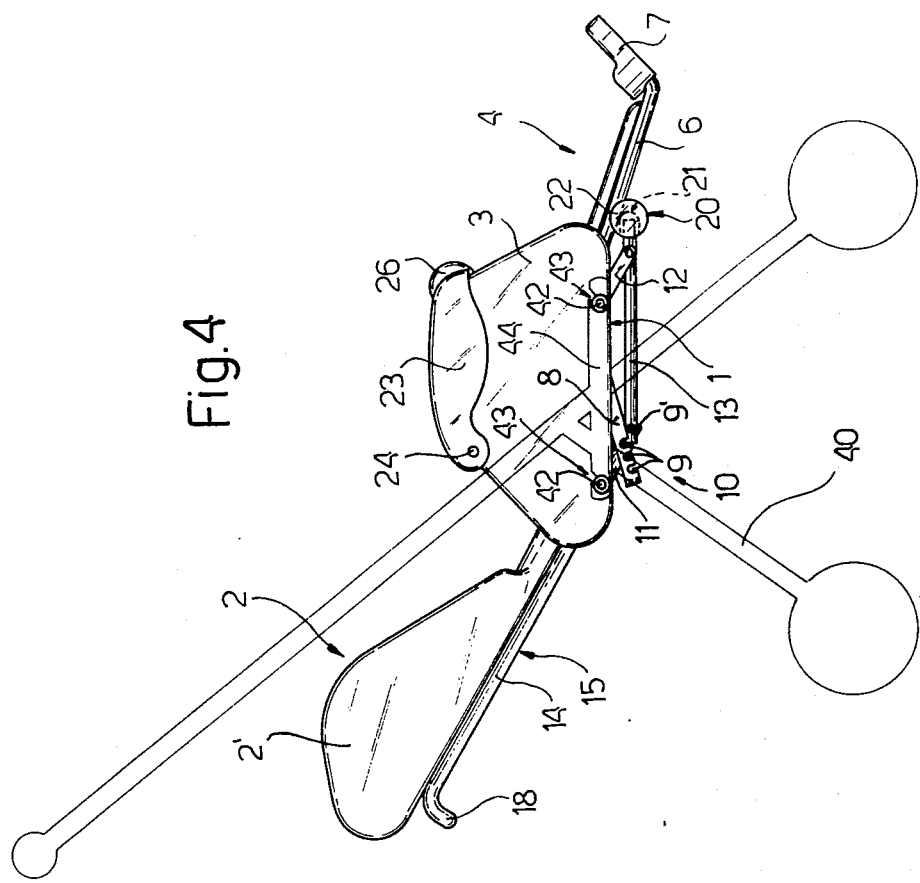

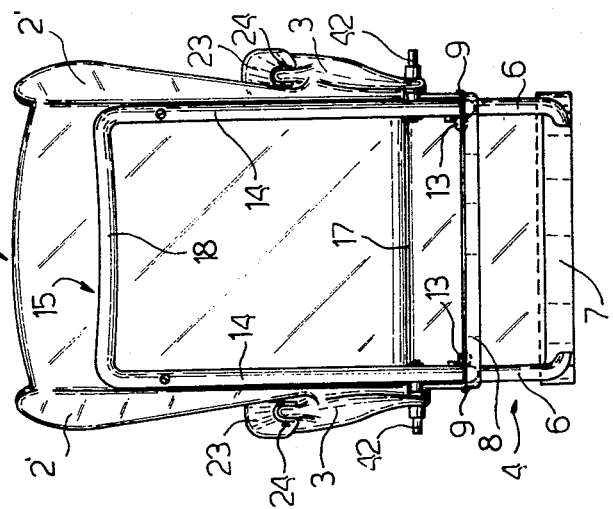
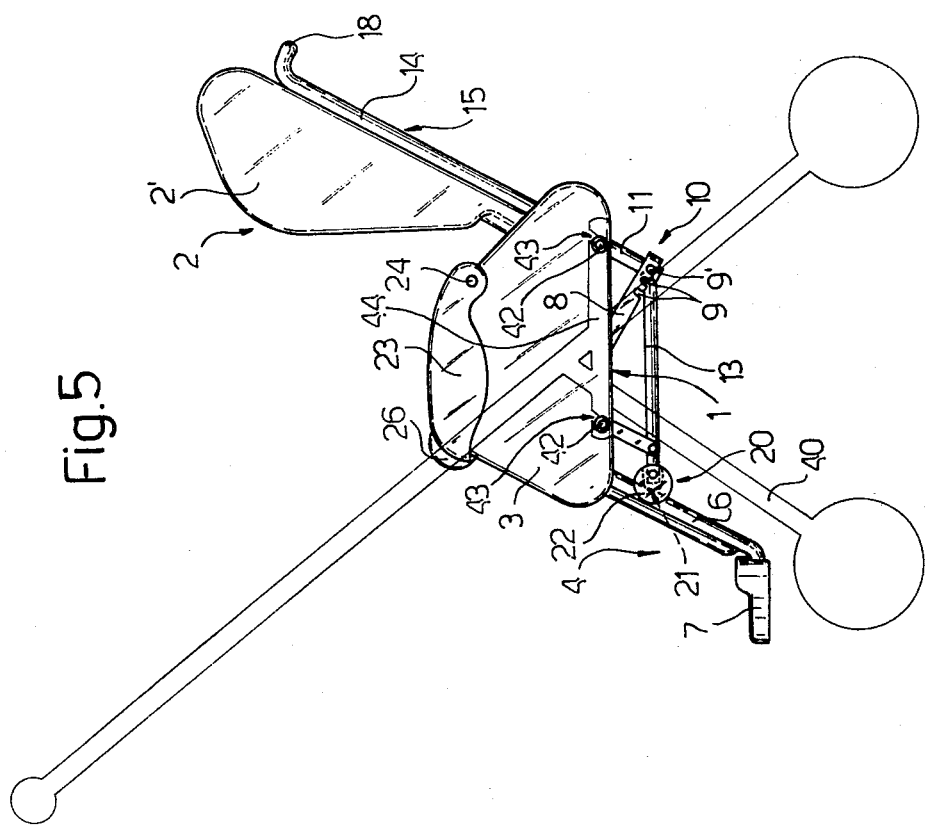

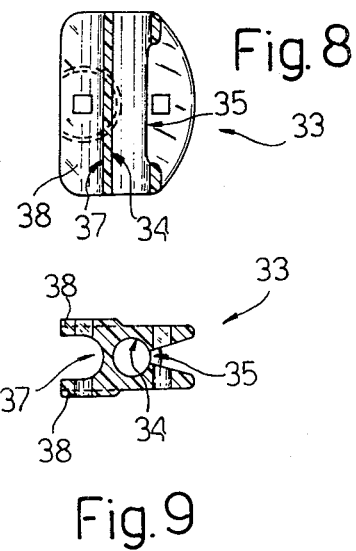
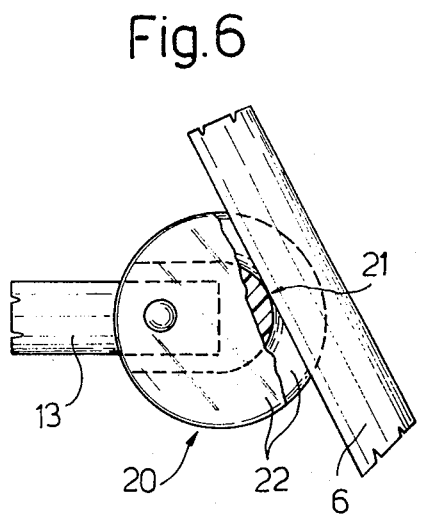
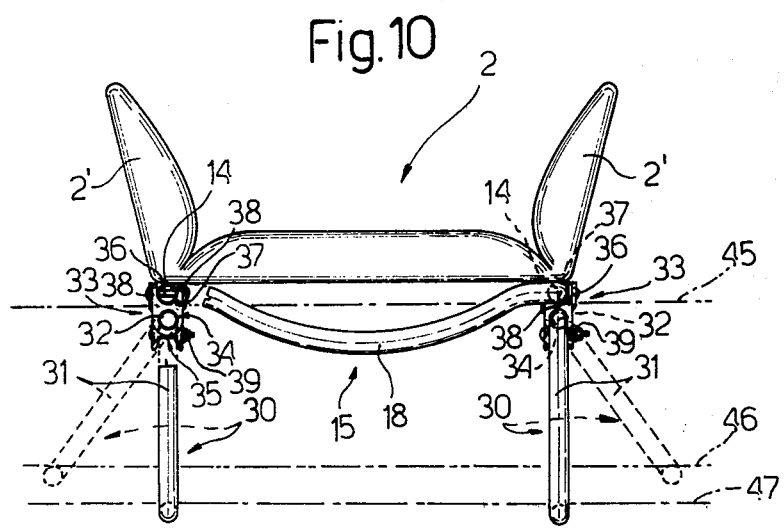

SEAT FOR A BABY'S PUSH CHAIR

The present invention relates to a seat which can be used both in association with a wheeled support structure to provide a push chair, and separately from this structure.

SUMMARY OF THE INVENTION

The object of the invention is that of providing a seat of this type which has a significant rigidity and which is therefore suitable to support a baby in the correct manner from the anatomical point of view.

Another object of the invention is that of providing a seat which, whilst being provided with a mechanism operable to adjust the inclination of the seat back and of the foot rest, can easily be brought into a very compact configuration, such as that necessary for transport, both when it is separated from the associated support structure, and whatever the configuration of use of this structure and the seat, to obtain a most compact configuration.

Another object of the invention is that of providing a seat which easily lends itself to being fitted to the seat back of a motor vehicle seat or an armchair or the like.

According to the invention there is provided a seat for a push chair comprising a support surface and a seat back tiltable with respect to the said support surface, a pair of containing side panels disposed laterally of the said support surface, and a foot rest which is also adjustable in inclination, between the said seat back and the said foot rest there being interposed a pivoted quadrilateral mechanism operable to control the pivoting movement of the foot rest with the pivoting movement of the seat back and comprising at least one pair of pivoted link rods to which there is pivoted a shaft, one of the said link rods being rigidly connected to the said seat back, characterised by the fact that the end of the said shaft which is located nearest to the said foot rest is provided with a seat which can constitute a support for a corresponding part of the foot rest.

BRIEF DESCRIPTION OF THE DRAWINGS

For a better understanding of the present invention one particular embodiment thereof will now be described with reference to the attached drawings, in which:

FIGS. 1, 2 and 3 are respectively side, front and rear views of the seat of the invention;

FIGS. 4 and 5 are side views of the seat of the invention in two different configurations, utilised in association with a wheeled support structure to provide a push chair;

FIG. 6 is a partially sectioned side view, on an enlarged scale, of a detail of the seat of FIG. 1;

FIGS. 8 and 9 are two orthogonal sections of a clamp utilised for fixing the said hooks to the seat back of the seat;

FIG. 10 is a schematic plan view of the seat, illustrated hooked to the seat back of a motor vehicle seat.

DETAILED DESCRIPTION OF THE INVENTION

Figure 1:
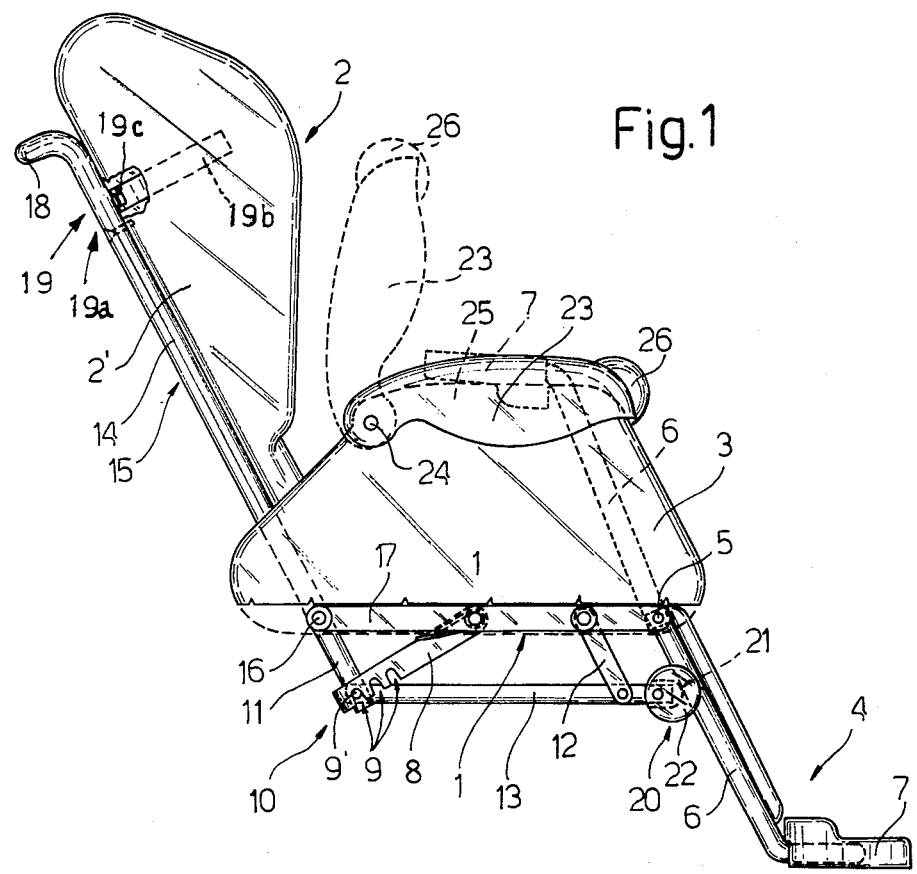

The seat of the invention has the structure visible in FIGS. 1, 2 and 3, and substantially comprises a support surface 1, a seat back 2, possibly provided with a pair of wings 2', angularly adjustable with respect to this surface, and a pair of side panels 3 for containment. The said parts can be formed in any convenient manner, for example they may form part of a suitably reinforced partly worked single blank of plastics material; in this case the seat back 2 and the side panels 3 are connected to the support surface 1 by regions of more readily deformable material.

The wings 2' are connected to the seat back 2, in addition to the said regions, by means of a metal connection element 19 (FIG. 1) substantially in the form of a strip (conveniently embedded within the said partly finished blank), which has a portion 19a fixed to the seat back 2 and a pair of arms 19b each of which is fixed to a wing; between the first and the second of these there is conveniently formed a perforation 19c serving to make the element more readily deformable in these regions. In this way the angular position of each wing 2' can be adjusted with respect to the seat back 2 by deforming the arm 19b with respect to the portion 19a; this portion is maintained due to the rigidity of the element 19.

The seat is furthermore provided with a foot rest 4 turnable about the axis of a pivot 5 by which it is connected to the surface 1. This foot rest can conveniently comprise a pair of shafts 6 to which a plate 7 is fixed.

For the purpose of transmitting the pivotal movement of the seat back 2 to the foot rest 4 there is provided an articulated quadrilateral mechanism, generally indicated 10 (FIG. 1) and substantially comprising at least a pair of link rods 11, 12 pivotally connected onto the lower surface of the seat 1, and a shaft 13 pivotally connected thereto.

The mechanism further comprises a pivoted lever 8 provided with notches 9 operable to engage over a corresponding pin 9' of the link rod 11 to lock the mechanism itself in a fixed configuration.

Conveniently, there are two such mechanisms 10, as in the embodiment illustrated, and the associated link rods 11 are constituted by lower sections of the struts 14 of a frame 15 fixed to the seat back 2 and pivotally connected with fins 16 to a reinforcing frame 17 which forms part of the seat 1; the frame 15 further comprises a crosspiece 18 which connects the strut 14 and is formed in such a way as to form a handle.

According to the invention, at the end of each shaft 13 nearest to the foot rest 4 there is fixed an abutment guide element 20 which comprises a supporting abutment 21 (FIG. 6) for a corresponding shaft 6 of the foot rest, which has a substantially cylindrical surface portion and a pair of upstanding guide portions 22 disposed laterally of the support itself, in such a way as to define with it a channel in which the said shaft can lodge and be guided in its movements; conveniently, as has been shown in the illustrated embodiment, each projecting portion has a circular outline.

The seat further comprises a pair of arm rests 23 each of which is pivotally connected to the associated side panel 3 by means of a pin 24; each arm rest has a substantially concave form and the cavity which it defines has a form and dimension such as to engage with the upper part 25 of the associated side panel 3 as can be clearly seen in FIG. 1; these arm rests are conveniently made of a plastics material.

The front ends of the said arm rests are connected by a crosspiece 26 which is preferably padded.

The width of the foot rest 4 is less than the distance between the side panels 3, in such a way that the foot rest itself can be positioned within the space lying between the side panels 3 and the crosspiece 26 upon the rotation thereof through a predetermined angle, as has been illustrated with broken lines in FIG. 1.

Figure 7:
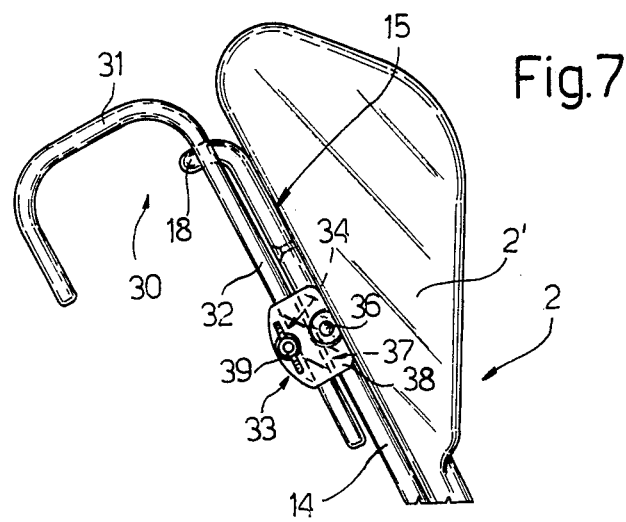
FIG. 7 is a side view of a part of the seat back of the seat of the invention provided with fixing hooks also forming part of the invention.

The seat also includes a pair of hooks 30 (FIG. 7) which can be fixed on the rear surface of the seat back 2. Each of these has a rectilinear part 32 of predetermined length and a hook-shape part 31; such parts can obviously be obtained from a suitably shaped single tubular element as in the case of the illustrated embodiment.

Each hook 30 is fixable to the seat back by means of suitable fixing means constituted, for example, by a clamp 33 (FIG. 7) which has a hole 34 (FIG. 9) which can be coupled with a strut 14 of the frame 15 and a notch 35 which serves to make the part of the clamp within the surface of the hole 34 deformable, to fix the clamp itself to this strut by means of a bolt 36 (FIG. 7); each clamp is then provided with a seat 37 (FIG. 9) for the rectilinear part 32 of a hook 30 and with a pair of fins 38 which can be resiliently deformed by the action of a threaded member 39 (FIG. 7) inserted in suitable holes of the fins themselves.

The seat described is used in the following way.

It can be disposed on any wheeled support structure of the type such as that schematically illustrated in FIGS. 4 and 5 in which it is generally indicated 40. The connection of the seat to this structure can be achieved in any convenient manner, for example by inserting a pair of pins 42 which form part of the reinforcing frame 17 of the seat, into corresponding slots 43 formed in bars 44 of the said support structure; it is obviously possible to mount this seat in the orientation shown in FIG. 4, which allows the baby to look in the direction in which the push chair is going, or in the opposite direction as shown in FIG. 5; a support structure particularly suitable to be used in association with the seat of the invention is that described in an earlier Patent Application by the same Applicant and entitled "a wheeled support structure for a carrycot or seat of a push chair or a perambulator" filed 1st August, 1980.

To change the inclination of the seat back 2, after having released the pins 9' (FIG. 1) from the notches, the seat back is moved to bring it into any desired configuration; the rotation of the seat back in a sense such as to lower it displaces shaft 13 towards supporting abutment right of FIG. 1. The cylindrical surface of the 21 of the abutment guide element 20 applies to the strut 6 of the foot rest 4 a force which tends to make it turn such as to raise the foot rest itself; in FIGS. 5 and 4 there have been shown two different configurations corresponding to different inclinations of the seat back and of the foot rest. When, on the other hand, the seat back 9 is raised, the mechanism 10 causes the displacement of shaft 13 towards the left of FIG. 1 and therefore allows the foot rest 4 to rotate downwardly, under the action of its own weight, maintaining the contact between shafts 6 and supporting abutments 21 of the abutment guide elements 20.

If the seat has to be brought into a very compact configuration, such as that necessary to transport it easily, both when it is separated from its associated support structure, and whatever the configuration of use of such structure and the seat, in order to obtain a most compact configuration, it is sufficient to raise the arm rests 23, carrying them into position indicated with broken lines in FIG. 1, and simultaneously to raise the foot rest 4 making it rotate about the pivots 5 to bring it between the side panels 3 as has been shown in broken outline in the same figure. By now returning the arms 23 into the initial position the foot rest is locked in the space lying between these panels and the crosspiece 26.

To bring the various parts into this configuration it is therfore not necessary to perform any complex operations, nor to dismantle parts of the seat; these cannot become accidentally displaced from the compact configuration in which they have been put unless the above indicated operations are repeated in the reverse order.

It is suitable to note that even though there is no positive mechanical connection between shafts 13 and the foot rest 4, but only an abutment relation between supporting abutments 21 of the abutment guide elements 20 and the struts 6 of the foot rest, the forces necessary for controlling the inclination of the foot rest itself are transmitted in a correct manner between supporting abutments 21 and the struts 6, and any relative transverse movement whatsoever is prevented because of the upstanding guide presence of the projections 22 coupled with the struts 6.

Moreover, because of the said abutment relation, both the seat back 2 and the foot rest 4 can be moved into a perfectly horizontal configuration which was not obtainable in conventional seats in which the connection between shafts 13 and the struts 6 is obtained by pivoting. In fact, as can be seen from FIG. 6, the abutment seats 21 of the elements 20 can move beneath the struts 6 of the foot rest 4 in such a way as to bring it to a perfectly horizontal position. The position of each wing 2' (FIG. 2) with respect to the seat back 2 can be varied as desired; the connection element 19 maintains the wing in the selected position because of the rigidity of the element itself, the arms 19b tend to remain in their position with respect to the section 19a.

The seat of the invention can also be used separately from a wheeled support structure, for example to be fixed to a motor vehicle seat or to an arm chair or the like. For this purpose the hook 30 can be utilised, the position of which with respect to the seat back 2 can be suitably adjusted; if the seat is to be fixed to the seat back of a motor vehicle seat which, in FIG. 10, has been indicated by the broken lines 45 and 46, and 45 and 47 which represent two different pairs of front and rear surfaces, by turning the threaded members 39 (FIG. 7) the rectilinear parts 32 of the hooks 30 are released from the clamps 33 and these can be made to slide and turn in the associated seats 37 until the relative parts of the hooks 31 are displaced into axial and angular positions suitable for obtaining a correct engagement onto the seat.

As can be clearly seen in FIG. 10, when the thickness of the motor vehicle seat is less than the dimension defined by the said hook shape parts, it is sufficient angularly to position the two hooks 30 with respect to the seat back 2 as has been indicated with the broken lines in FIG. 10.

The said hooks can also be separated in an obvious manner, and with ease, from the seat back 2 whenever they are not to be utilised.

It is apparent that the embodiment of the invention which has been described can be modified and varied, both as to its form and the arrangement of various parts, without by this departing from the scope of the invention itself.

I claim:

1. In a push chair, a seat comprising a support, a seat back, and a foot rest, said seat back and said foot rest being adjustable in inclination with respect to said support, and an articulated quadrilateral mechanism operatively connected between said foot rest and said seat back, said mechanism including a shaft and a link rod, said link rod rigid with said seat back and extending between said shaft and said support, said shaft having one end disposed towards said foot rest, said foot rest including at least one strut pivotally connected to said support, and guide means mounted to said shaft one end and including means to partially embrace opposite sides of said strut and to cooperate therewith in a slidable manner so that inclination of said seat back enables suitable inclination of said foot rest with respect to said support.

2. A seat as claimed in claim 1, wherein said guide means includes a block having a substantially cylindrical surface portion slidably engageable with said strut, and a pair of projections disposed laterally of said surface and extending at right angles to the axis thereof defining a channel to partially embrace said strut.

3. A seat as claimed in claim 1, further comprising a pair of containment side panels disposed laterally of said support, the width of said foot rest being less than the distance between said side panels in order to allow said foot rest to be brought, following a rotation through a predetermined angle, into the space lying between said panels.

4. A seat as claimed in claim 3, further comprising a pair of arm rests each of which is pivotable on one of said side panels and has a hollow shape for coupling with the upper part of the associated side panel, said arm rests being connected by a transverse bar.

5. A seat according to claim 2, characterised by the fact that each of the said projections has a substantially annular form.

6. A seat according to claim 1, in which the said seat back includes a pair of lateral wings, characterised by the fact that between each wing and the said seat back there is interposed at least one strip of deformable metal material which can be bent when the angular position of the wing is adjusted with respect to the seat back.

7. A seat according to claim 1, characterised by the fact that it includes a pair of hooks fixed to the rear part of the seat back, each of which hooks includes a substantially rectilinear part and a pair of clamps fixed to the seat back and operable to connect the said hooks to it, each clamp comprising a seat to allow axial sliding and rotation of the said rectilinear part of a hook and locking means for locking the said part in a predetermined position with respect to the associated clamp.

8. A seat according to claim 7, characterised by the fact that the said seat is formed between a pair of resiliently deformable fins of the said clamp and the said locking means comprise screw means operable to vary the distance between the said fins.

* * * * *